United States Patent [19]

Drexel et al.

[11] Patent Number: 4,524,616

[45] Date of Patent: Jun. 25, 1985

[54] ADJUSTABLE LAMINAR FLOW BYPASS

[75] Inventors: Charles F. Drexel, Rolling Hills Estates; Richard F. Blair, Long Beach, both of Calif.

[73] Assignee: Tylan Corporation, Carson, Calif.

[21] Appl. No.: 529,057

[22] Filed: Sep. 2, 1983

[51] Int. Cl.³ .............................................. G01F 5/00
[52] U.S. Cl. .................................................... 73/203
[58] Field of Search .................. 73/202, 203, 861.52, 73/861.54, 861.55, 861.58

[56] References Cited

U.S. PATENT DOCUMENTS

| 341,515 | 5/1886 | Spooner | 73/203 |
|---|---|---|---|
| 1,187,607 | 6/1916 | Cagney et al. | 73/861.58 |
| 2,301,355 | 11/1942 | Armentrout | 138/45 |
| 2,858,697 | 11/1958 | Entwistle | 73/203 |
| 3,587,515 | 6/1971 | Anderson | 73/861.58 X |
| 3,851,526 | 12/1974 | Drexel | 138/46 X |
| 4,047,695 | 9/1973 | Cleveland et al. | 138/46 X |

FOREIGN PATENT DOCUMENTS

| 896727 | 7/1949 | Fed. Rep. of Germany | 73/861.52 |
|---|---|---|---|
| 1190912 | 5/1970 | United Kingdom | 73/861.58 |

Primary Examiner—Herbert Goldstein
Attorney, Agent, or Firm—Nilsson, Robbins, Dalgarn, Berliner, Carson & Wurst

[57] ABSTRACT

A frusto-conical adjustable laminar flow bypass restrictor which is disposed within a conically tapering bore to form a conduit capable of maintaining laminar flow and adjustable to form annuli of varying thicknesses to allow proper sensor calibration over a wide range of flow rates.

11 Claims, 6 Drawing Figures

ADJUSTABLE LAMINAR FLOW BYPASS

FIELD OF THE INVENTION

The fields of art to which the invention pertains include the fields of pressure differential measuring and testing devices, flowmeters and conduit restrictors.

BACKGROUND AND SUMMARY OF THE INVENTION

There have been developed in the prior art a variety of flowmeters in which a manometer or other device is connected across opposite sides of a flow restrictor.

Mass flow instruments measure the flow rate of a fluid not by directly determining the pressure differential across a restrictor, but by measuring the actual flow of a small portion of the fluid. Such applications require that the flow of the fluid be divided into two or more paths with an exact ratio maintained between the individual path flow rates. Mass flow detection is a means of measuring the weight flow rate of a gas. Controlling mass flow is the same as controlling the flow of molecules since equal volumes of ideal gases, under the same conditions, contain the same number of molecules. In contrast volumetric flow measurement and control must be corrected for local temperature and pressure conditions in order to determine molecular flow.

In a typical mass flow meter, a very small percentage of the flow is diverted into a measuring or sensor section. This percentage may be as small as one part in 40,000 and the measuring section is typically a very thin tubular conduit which is much longer than its diameter so that laminar flow prevails throughout the conduit. During laminar flow of a fluid, the flow rate is directly proportional to pressure drop and inversely proportional to viscosity. In contrast, during turbulent flow the flow rate is proportional to the square root of the pressure drop and largely independent of viscosity. Therefore, in the design of a mass flow instrument it is important to provide conditions that ensure laminar flow in each path.

The bypass assembly or primary fluid path precisely splits the gas flow, directing a sample of gas through the sensor and enabling the laminar flow of the remaining gas through the instrument. The bypass assembly generally comprises a plurality of closely-spaced fluid passageways, each passageway having an effective diameter sufficiently small for assuring laminar fluid flow. For example, a plurality of fine mesh screen discs are stacked together to obtain a desired pressure drop by defining a plurality of elongate continuous channels bounded by the screen material. Alternatively, screen material has been spirally wound around a mandrel and secured in its wound form to form channels between the spiral layers. Laminar flow may also be ensured by using as a flow restrictor one or more juxtaposed discs, each having channels formed from its perimeter to an opening through opposite sides of the disc. The fluid is directed to the perimeter of the disc and is conveyed by the conduits to the opening, thus forming an elongate channel having a sufficiently large length to diameter ratio to assure laminar flow of the fluid.

Mass flow instruments accurately and reliably measure and control mass flow rates of gases from below 5 standard cubic centimeters per minute (SCCM) to about 500 standard liters per minute (slm) without the need for pressure or temperature corrections. The flow-measuring section or sensor assembly may comprise a tube or conduit externally wound with two heated resistance thermometers to measure the gas flow. For example, in a particular mass flow instrument, a bridge circuit senses the temperature differential and develops a linear output signal of from 0 to about 5 vdc proportional to the gas flow rate over the calibrated range. In a mass flow controller, the signal is compared to a command voltage from a potentiometer or voltage source. This comparison generates an error signal that alters the valve opening, thereby changing the flow rate until a set point is reached. A feedback circuit provides dynamic compensation for optimum stability and response. In order to maintain optimal calibration of the mass flow instrument, the flow rate through the sensor conduit must be maintained within the range of laminar flow in order to maintain a linear output signal over the full-scale flow rate; e.g., 0 to 5 vdc with regard to the sensor hereinbefore described.

The bypass assemblies hereinbefore described provide laminar flow in the primary fluid path of the mass flow instrument and allow the accurate and reliable measure and control of the mass flow rates by such instruments within certain ranges. However, as the output of the sensor assembly is dependent upon the rate of fluid flow therethrough and thus the pressure drop across the bypass flow restrictor, the flow ratio, i.e. the amount of fluid passed by the bypass section in relation to the measuring section, can be changed only by replacing the flow restrictor in the bypass assembly to allow a greater or lesser volume of fluid across a pressure drop which maintains the optimal sensor flow. That is, once the instrument is calibrated to respond to a given sensor flow range, the total flow through the instrument cannot be substantially varied by changing the input pressure of the fluid, as the pressure variations will cause the sensor flow to extend beyond the calibrated limits, i.e., beyond the laminar flow range of the sensor tube.

Thus, in the past the flow ratio has been modified by the substitution of replaceable laminar flow-forming elements having varied channel or passage sizes which allow a different primary flow rate while retaining a substantially similar pressure drop. However, as such replaceable elements require disassembly of the bypass flow restrictor, it has been a desideratum to provide an adjustable laminar flow bypass assembly which enables the continuous adjustment of flow ratios without requiring the disassembly of the bypass flow restrictor and the substitution of predetermined conduits therethrough.

The present invention provides a bypass assembly which is continuously adjustable to provide a wide range of flow volumes while allowing the maintenance of a constant pressure drop across the bypass assembly to ensure a constant and optimal flow through the sensor tube. This is accomplished by providing a frusto-conical flow restrictor having a perimeter surface essentially parallel to the surface of a frusto-conical bore, and capable of defining an annular conduit therebetween having an annulus being of a thickness to width ratio to provide laminar flow, the frusto-conical portion being axially and selectively movable within the frusto-conical bore to provide annuli having variable thicknesses. Several related embodiments are disclosed, each providing the described advantages. The adjustable laminar flow bypass assembly of the invention may be combined with an elongate laminar flow conduit, serving as a measuring section, to constitute a linear flowmeter.

Such a meter includes a housing having a fluid inlet and a fluid outlet, the housing defining a fluid path between the inlet and outlet. The adjustable flow element is disposed in this fluid path to define an annular conduit having dimensions appropriate for the maintenance of laminar flow, in parallel circuit with the measuring section conduit. Means are provided for measuring the rate of flow of fluid through the measuring section conduit, which means are known in the art and constitute no part of the present invention.

DETAILED DESCRIPTION

As required, details of illustrative embodiments of the invention are disclosed. However, it is to be understood that these embodiments merely exemplify the invention which may take forms different from the specific embodiments disclosed. For example, while the bypass assembly is described with regard to mass flow instruments, the flowmeter of the present invention may also be employed with volume flow instruments as desired. Structural and functional details are not necessarily to be interpreted as limiting, but as a basis for the claims.

Figure 1:
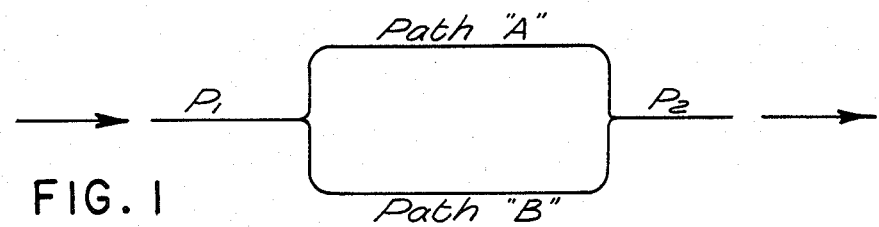
FIG. 1 is a schematic representation of the fluid flow paths in a flow divider.

Referring to FIG. 1, fluid paths A and B constitute the flow through a flowmeter from the inlet $P_1$ to the outlet $P_2$. The line labelled PATH A represented fluid flow through the measuring section of the flowmeter and the line designated PATH B represents fluid flow to the bypass section of the flowmeter. Optimally, the pressure drop should be the same across each path.

In the particular embodiments illustrated herein, PATH A depicts the sensor flow and comprises a tube of sufficient elongation to assure laminar flow. PATH B includes the frusto-conical adjustable bypass flow assembly, which is proportioned to assure laminar flow as hereinafter described.

Figure 2:
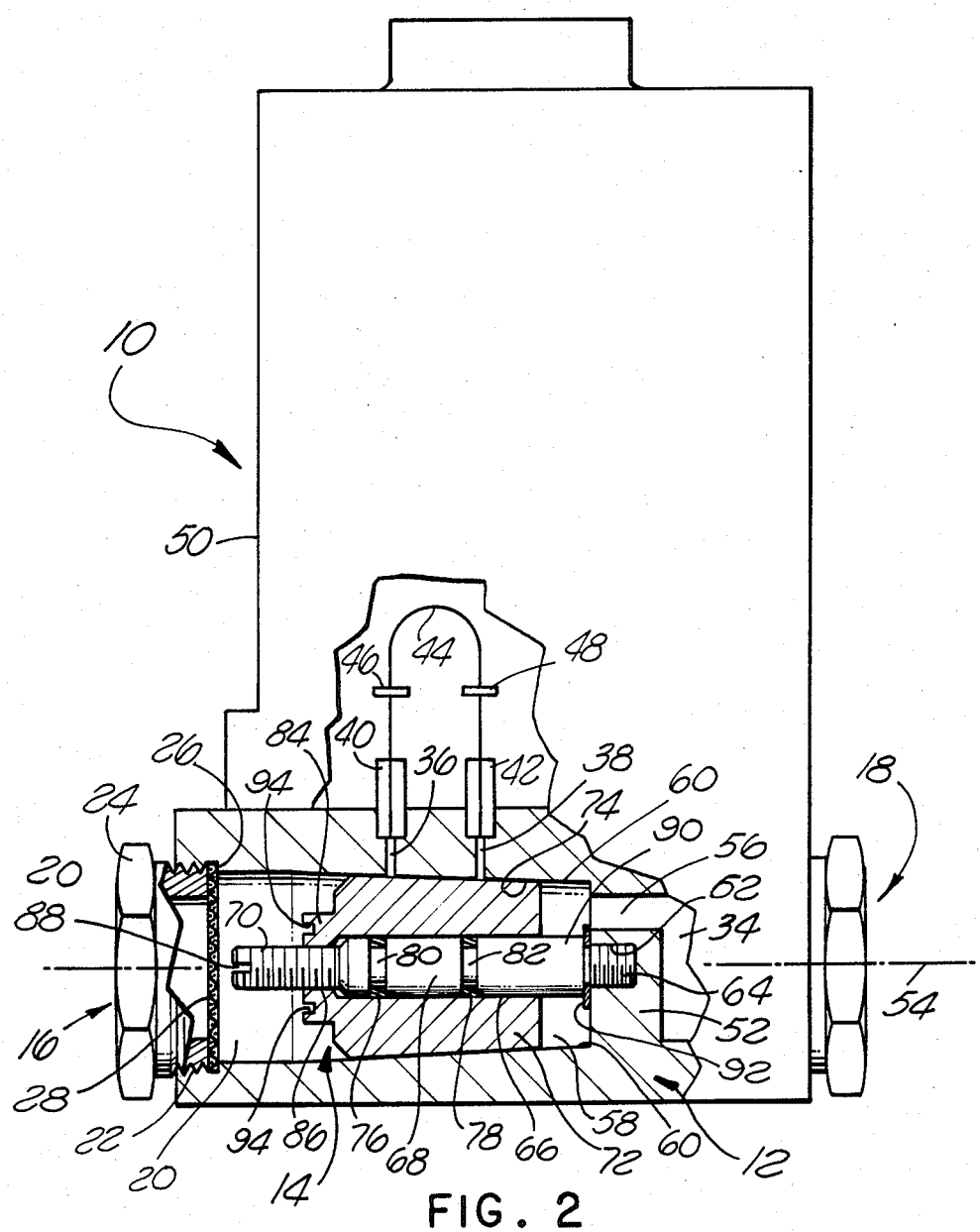
FIG. 2 is a schematic illustration in partial cross-section of portions of a flowmeter incorporating one adjustable flow bypass embodiment.
Figure 3:
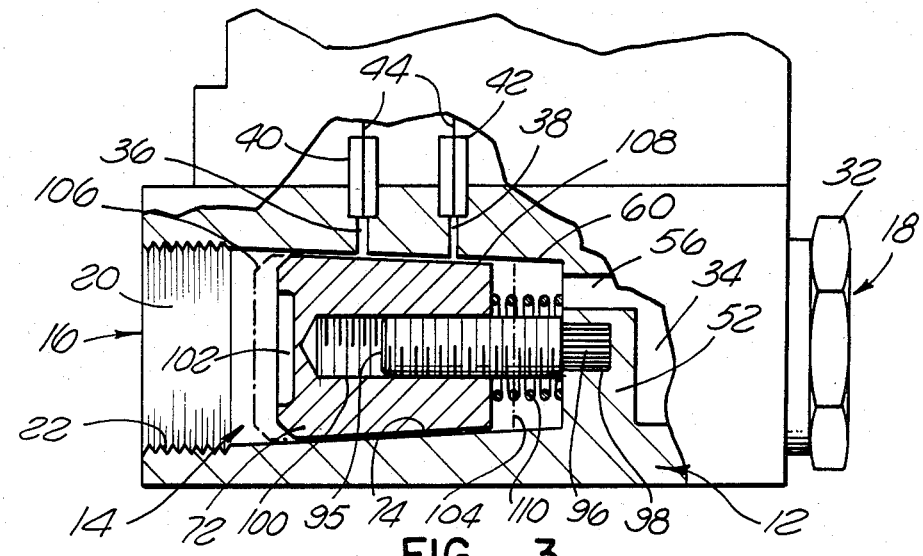
FIG. 3 is a schematic illustration in cross-section of a portion of a second adjustable flow bypass embodiment.

Referring now to FIGS. 2 and 3, a flowmeter 10 is illustrated incorporating an adjustable laminar flow bypass in accordance with this invention. The flowmeter includes a housing 12, bored and counterbored to define a passage 14 in a manner which is more fully described hereinafter. The passageway 14 terminates with inlet and outlet ports 16 and 18, respectively, for the measured fluid flow. An upstream portion 20 of the passageway 14 is seen to include internal threads 22, adapted to receive an externally threaded fitting 24 to enable the connection of the passageway 14 with a fluid source, not shown. The upstream portion 20 includes a shoulder 26 which receives a fine mesh screen 28 which is compressively retained by the fitting 24 and protects against the influx of particulate contamination. As is shown in FIG. 4, the outlet port 18 includes internal threads 30 which matingly receive external threads, not shown, on a fitting 32, which enables downstream connection of the passageway 14.

Figure 4:
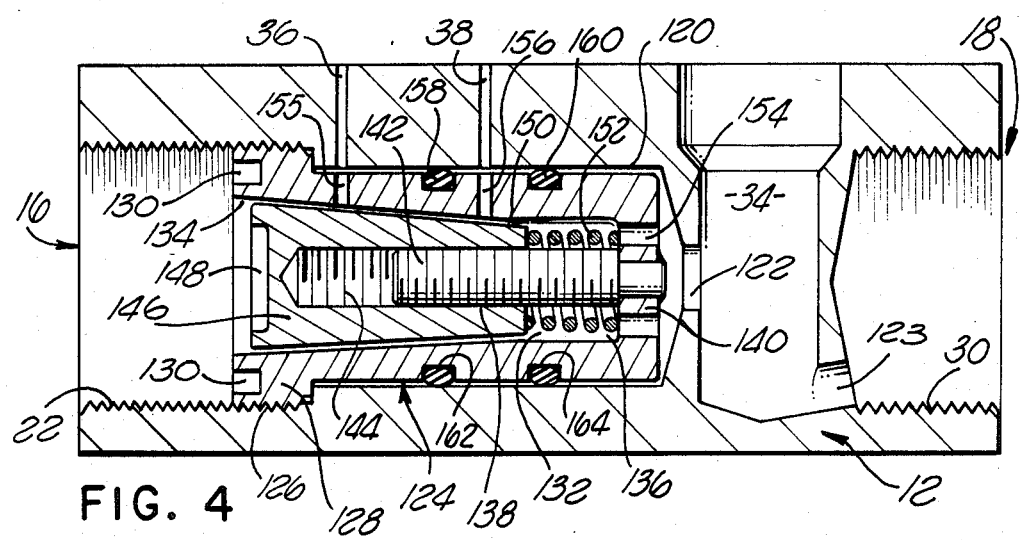
FIG. 4 is a schematic illustration in cross-section of a portion of a third adjustable flow bypass embodiment.

In each of the FIGS. 2, 3 and 4 there is shown, upstream of the outlet port 18, an intermediate portion 34 of the passageway 14, which may be adapted to receive a flow controlling valve assembly, not shown, which is normally in an open position during operation of the flowmeter. The flow controlling valve and its function are known in the art and, as such, do not constitute a part of this invention. A particularly advantageous flow controlling valve which may be employed in the intermediate portion 34 is shown in U.S. Pat. No. 3,650,505.

Upstream and downstream taps in the housing 12, in the form of boreholes 36 and 38, respectively, are provided for disposing respective attachment ends 40 and 42 of a measuring or sensor tube 44. The ends 40 and 42 are tubular members through which the ends of the sensor tube 44 are tightly secured, so that fluid flowing into the end 40 is conducted entirely through the sensor tube 44 and exits through the end 42. The measuring section tube is very thin and elongate, and in this exemplary embodiment the tube 44 has an inside diameter of 0.010 inch and a length of 2.50 inches. Thermal elements 46 and 48 detect the mass flow rate of a fluid passing through the tube 44. The method by which this is accomplished is known in the art and need not be further described, although an advantageous fluid flow measuring system is described in U.S. Pat. No. 3,938,384. Flowmeter electronics are assembled in a second housing 50 as known in the art and which are not per se a part of the invention herein.

Returning now to FIG. 2, a first embodiment of the adjustable laminar flow bypass assembly will be described. A shoulder 52 of the housing 12 is seen to extend into the passageway 14 beyond an axial center line 54 therethrough, leaving a passageway 56 which communicates between the intermediate portion 34 and a primary flow portion 58 of the passageway 14, said primary flow portion 58 being bounded by a frustoconical perimeter surface or bore 60 formed in the housing 12. The taper of the bore 60 is not critical to the invention and is limited only by turbulence which may be induced by the abutment of an excessive taper within portions of the passageway 14 which are normal to the axis 54, or by factors such as adjustment resolution or other considerations herein described. An exemplary taper of three degrees is shown in the embodiments herein described.

Shoulder 52 is seen to include an internally threaded bore 62 which matingly receives an externally threaded portion 64 of a spindle 66, which is disposed on the axial center line 54 of the passageway 14. The spindle 66 is seen to include an intermediate thickened portion 68 and to terminate in an externally threaded upstream portion 70 extending therebeyond.

Continuing with FIG. 2, the spindle 66 is seen to support a frusto-conical flow restrictor 72 within the passageway 14, the flow restrictor 72 having a perimeter surface 74 essentially parallel to the surface of the frusto-conical bore 60. The restrictor 72 is supported by the thickened portion 68 of the spindle 66 via 0-rings 76 and 78 disposed, respectively, in grooves 80 and 82 in the spindle 66. The restrictor 72 includes a hub portion 84 which, in turn, includes an internally threaded bore 86 adapted to matingly engage with the externally threaded upsteam portion 70 of the spindle 66.

The spindle 66 may be inserted into the housing 12 in combination with the restrictor 72, or the spindle 66 may first be inserted into the housing 12 and individually secured and the restrictor 72 threaded thereon as desired. In either event, the threaded portion 64 of the spindle 66 is inserted into the bore 62 and tightened, via a slot 88 in the portion 70 until a downstream end 90 of the thickened portion 68 impinges the shoulder 52. A locking washer 92 may be disposed therebetween to further secure the spindle 66. The restrictor 72 is seen to include, in the upstream face of the hub 84, detents 94 adapted to receive a spanner wrench, not shown, or other means in order to enable the adjustment of the proximity of the perimeter surface 74 to the bore 60, as hereinafter described in detail with regard to FIG. 3.

In the description of FIG. 3, inasmuch as certain basic details thereof are identical with the description of FIG. 2, the reference numbers of FIG. 2 will be used to indicate similar portions in FIG. 3.

In FIG. 3, the flow restrictor 72 is seen to be supported by an externally threaded spindle 95 which includes a splined downstream portion 96 which is affixed within an axially centered bore 98 in the shoulder 52 by an interference fit therebetween. The flow restrictor 72 includes an internal bore 100 which matingly engages the externally threaded spindle 94 to enable the rotation of the restrictor 72 thereabout, with the resultant progression and regression of the restrictor 72 with respect to the housing 12. Such rotation is enabled by the insertion of an appropriate tool into the notch 102 of the restrictor 72. It will be appreciated that such procession and regression causes the restrictor 72 to positions indicated by the segmented lines 104 and 106, respectively, with a resultant change in the thickness of an annular gap 108 which is formed between the perimeter surface 74 and the bore 60. As the restrictor 72 moves axially as described, said restrictor is secured by a coiled spring member 110 which abuts the shoulder 52.

With regard to the gap 108 and other gaps described herein, the character of the flow through the annular conduit of the flowmeter (represented by the Reynold's number) is hereinafter described to be a function of the cube of the gap thickness. Thus, the perimeter surface of the flow restrictor and the surface of the frusto-conical bore should be as concentric as possible during the rotation of the flow restrictor in order to ensure even laminar flow in the annulus throughout the range of adjustment.

Referring now to FIG. 4, an alternative embodiment is disclosed wherein portions identical to those described with respect to FIGS. 2 and 3 are referred to by like reference numerals.

In this instance, the housing 12 is seen to contain an essentially cylindrical bore 120, which communicates with the intermediate portion 34 through a passageway 122. The intermediate portion 34 is seen to communicate, in turn, with a passageway 123, which leads to the outlet port 18. The housing 12 is also seen to include upsteam and downstream taps 36 and 38, respectively, which open into the bore 120.

An insert 124 is seen to be received within the bore 120 and retained therein by external threads 126 at an upstream and 128 thereof, the threads 126 matingly engaging with the internal threads 22 of the housing 12. The insert 124 is axially rotated upon insertion and engagement of the threads 22 and 126 by a spanner wrench, not shown, or similar device which engages the detents 130 in the upstream end 128.

The insert 124 is seen to define a bore 132 having a frusto-conical portion 134 which tapers, in this embodiment, toward a downstream portion 136. An externally threaded spindle 138 is seen to be axially positioned within the insert 124 and attached, by welding or other means, to a downstream end portion 140 thereof. The spindle 138 is seen to bear external threads 142 adapted to matingly receive the internal threads 144 of the flow restrictor 146.

The flow restrictor 146 is seen to be frusto-conical in shape having a circumference essentially parallel to that of the frusto-conical bore portion 134. Upon insertion of the flow restrictor 146 into the bore portion 134 and engagement of the threads 142 and 144, the restrictor 146 may be rotated by an appropriate tool, not shown, inserted into a slot 148, to allow the longitudinal adjustment of the restrictor 146 with regard to the insert 124 in order to allow adjustment of the width of the annular gap 150 therebetween. Resistance to undesired rotation of the restrictor 146 is provided by a spring 152 disposed between the restrictor 146 and the downstream portion 140 of the insert 124.

In the embodiment shown in FIG. 4, fluid from the inlet port 16 flows through the gap 150 between the flow restrictor 146 and the frusto-conical bore portion 134, through the downstream bore portion 136 and then through cylindrical passageways 154 to the intermediate portion 34. The fluid then progresses through the passageway 123 to the outlet port 18. In this regard, the flow through the gap 150 is laminar and measured by a sensor means, hereinbefore described with respect to FIG. 2, and which communicates with the taps 36 and 38. Flow between the insert 124 and the housing 12 is prohibited by the intermeshing surfaces provided by the threads 22 and 126. In addition, sealing washers, not shown, may be provided between the upstream and 128 and the housing 12 if desired.

The tap 36 is seen to communicate with the fluid flow across the gap 150 through a passageway 155 in the insert 124. In a similar manner, the downstream tap 138 communicates with the gap 150 through a passageway 156. Undesired flow between the passageways 155 and 156, i.e., flow between the insert 124 and the housing 12, is prevented by an O-ring 158, and similar flow downstream of the passageway 156 is prevented by an O-ring 160. These O-rings are received, respectively, within detents 162 and 164 on the surface of the insert 124.

Figure 5:
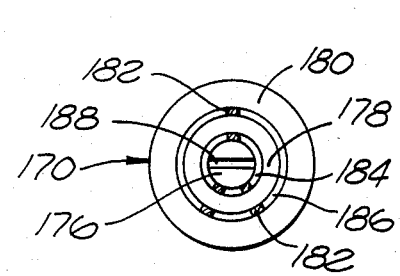
FIG. 5 is an end view of a variation of the frusto-conical flow restrictor of the invention.
Figure 6:
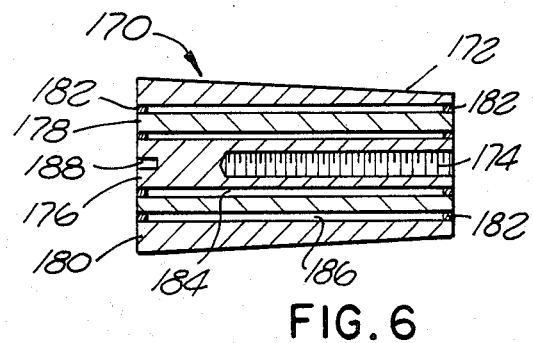
FIG. 6 is a cross-sectional view of the flow restrictor of FIG. 5.

Turning now to FIGS. 5 and 6, an alternative flow restrictor 170 will be described. The flow restrictor 170 may be used in any of the embodiments heretofore set forth, or in any other application wherein it is desired to pass a substantially increased volume of gas through the primary fluid path, i.e., where the fluid flow rate requires a gap which exceeds the width required to maintain laminar flow. Turning to FIG. 6, the restrictor 170 is seen to have a frusto-conical shape, which in any given application has a circumferential wall 172 essentially parallel to the described frusto-conical bores and includes a threaded bore 174 adapted to receive a spindle as hereinbefore described. In order to provide additional mass flow, the restrictor 170 is seen to be constructed with a central cylindrical portion 176, and intermediate tubular portion 178 and an outer tubular portion 180, said portions being connected by welds 182 and disposed to form annular gaps 184 and 186 having a proper width to insure laminar flow therethrough. While other laminar flow conduits may be formed in the flow restrictor 170, such as a plurality of longitudinally drilled conduits therethrough, the concentric annular conduits shown in FIGS. 5 and 6 have been proven to provide higher flow rates and better laminar flow than such tubular conduits. As herebefore described with regard to FIGS. 1 and 2, the restrictor 170 includes a slot 188 to allow the insertion and adjustment of the restrictor 170, by an appropriate tool, within the housing 12.

With regard to each of the adjustable laminar flow bypass assemblies herebefore described, the maintenance and adjustment of laminar flow will now be described.

Flow through a channel may be characterized by the non-dimensional parameter known as the Reynold's number where:

$$R = 4mpV_m/\mu \quad (1)$$

where p is the density of the fluid, $V_m$ is the mean velocity of the conduit, u is the fluid viscosity and m is the hydraulic radius defined as the conduit area (A) divided by the conduit perimeter (L). The effective diameter of the conduit can be considered to be 4m. The Reynold's number expresses the ratio of the inertia forces to the viscous forces in the fluid. For low values of R, the flow is laminar, while for high values of R, inertia forces predominate and the flow tends to be turbulent. The Reynold's number transition generally occurs in the range of about 1600 to about 2800 Reynold's number, i.e., a Reynold's number of less than 1600 may be assumed to enable laminar flow. For any particular structure, the transition Reynold's number can be determined by noting the mean velocity at which fluid of known density and viscocity flows in a turbulent manner, and applying the information to the formula set forth above. Each of the described embodiments illustrates specific structures to accomplish laminar flow in the bypass section, PATH B, in combination with laminar flow in the measuring section, PATH A. In each of the embodiments, the fluid being measured is gaseous, but the structure and concepts are applicable to liquids as well.

Another known equation for steady state laminar flow is:

$$\frac{dp}{dl} = \frac{V}{m} \frac{1}{2} pV_m^2 \quad (2)$$

where V is a non-dimensional resistance coefficient which, over the laminar flow range, can be shown to be given by the equation.

$$V = C/R \quad (3)$$

where C is a constant. Combining equations 1–3, there is obtained an equation which expresses the linearity of the pressure gradient with the volumetric flow in the channel:

$$\frac{dp}{dl} = \frac{CL^2}{8A^2} \mu V_m = K_1 \mu V_m. \quad (4)$$

From the foregoing equations, the Reynold's number for the sensor tube in PATH A may be shown to be $$R_t = \frac{4}{\pi} K_2 \frac{\dot{\omega}}{d} \quad (5)$$

wherein d is the diameter of the tube and $\omega$ is the mass flow in standard cubic centimeters per minute (SCCM) and $$\dot{\omega}_t = \frac{K_1}{41} \frac{d^4}{L} dp. \quad (6)$$

For a thin annulus of a mean radius W and a gap thickness t, where W is much greater than t $$R_a = 2K_2 \frac{\dot{\omega}}{W + t} \quad (7)$$

and $$\dot{\omega}_a = \frac{K_1}{12} \frac{t^3 W}{L} dp. \quad (8)$$

In the embodiments described, the sensor or measuring tube had a length (L) of 2.50 inches, diameter (d) of $1 \times 10^{-2}''$ and maintains an optimal calibration at a mass flow of 2 SCCM, thus, employing equation (6)

$$K_1 = 205 \times 10^8/dp. \quad (9)$$

Inserting this value for $K_1$ into equation (6) yields $$\omega = 5 \times 10^8 d^4/L. \quad (10)$$

Therefore, for an annulus having the same dp, employing equation (8), $$\dot{\omega}_a = \frac{205 \times 10^8}{12} \frac{t^3 W}{L} = 17 \times 10^8 \frac{t^3 W}{L}. \quad (11)$$

From empirical data regarding the described sensor tube, for an $R_t$ of 28.7 at a $\omega$ of 5 SCCM, and employing equation (5), $K_2$ was calculated to be $4.5 \times 10^{-2}$. Inserting this derived $K_2$ into equation (5)

$$R_t = 6 \times 10^{-2} \omega/d, \quad (12)$$

and inserting the derived $K_2$ into equation (7)

$$R_a = 9 \times 10^{-2} \omega/W + t \quad (13)$$

wherein the thickness is so small to allow simplification to $$R_a = 9 \times 10^{-2} \omega/W, \quad (14)$$

thus, to increase mass flow ($\omega$) without increasing the Reynold's number (R), a proportional increase in the mean circumference of the annulus (W) is required.

The dimensions for the described adjustable laminar flow bypass assemblies may be determined empirically. For example, in the bypass restrictor described in FIG. 3 the frusto-conical flow restrictor 72 has a minimum diameter (D) of 0.416'', and the gap 108 between the restrictor 72 and the bore 60 has a length (L) of 0.50'' between the sensor taps 36 and 38. The gap 108 thus has a circumference or width (W) of $\pi(0.416) = 1.31$. For a mass flow of $20 \times 10^3$ SCCM equation (11) yields a t of 0.0165. Inserting this data into equation (13) yields a maximum Reynold's mumber (R) of 1354. Since this R is less than the Reynold's transition number of 1600, the bypass assembly of FIG. 3 will provide laminar flow.

It is preferred that the taps 36 and 38 be positioned within the gap formed between the flow restrictor and the frusto-conical bore of the bypass assembly. It has been determined empirically that laminar flow is formed in an annular channel, of the proper dimensions as hereinbefore described, at a distance of about 20 times the gap thickness (t) downstream from the beginning of the annular channel. The flow remains laminar at least until very near the downstream end of the channel. Thus, it will be found that if the taps 36 and 38 are both disposed within the truly laminar flow region, the pressure drop across the taps is proportional to the flow rate in the bypass assembly. However, in certain applications the taps may be placed outside of the laminar flow region, i.e., above and below the flow restrictor in the bypass section, as desired. Since exit nonlinearity is a small factor when compared to entrance nonlinearity, it is also possible to place the upstream tap within the laminar flow region and the downstream tap outside of the laminar flow gap and still maintain reasonable linearity for certain purposes. Regardless of whether the taps 36 and 38 are placed within or without the gap, the progression and recession of the flow restrictor should be noted in order that the desired laminar or non-linear flow may be maintained at any such position.

With regard to the bypass assemblies herein described, it will be noted that a three-degree taper is employed with respect to the frusto-conical bore and the flow restrictor. For a taper of three degrees and a flow restrictor longitudinal stroke of ⅓ of an inch, the maximum thickness of the annular gap ($t_{max}$) of the adjustable laminar flow bypass assembly of FIG. 3 is $0.333 \sin\theta = 0.0174$. Substituting this value along with an average gap width (W) of 1.38 and a gap length (L) of 0.50 into equation (11) yields a maximum mass flow ($\omega$) of 25 standard liters per minute. At this maximum flow, the adjustable flow bypass restrictor of FIG. 3 yields a Reynold's number of about 1600, which is within the desired limits of laminar flow.

The assembly of FIG. 3 was tested to determine performance over a wide range of restrictor adjustments. The spindle 95 and the bore 100 are matingly threaded at 56 turns per inch. As described, the stroke of the restrictor 72 was 0.333 inches from total insertion to maximum upstream regression. Thus, the total usable adjustment comprised 18.6 turns, and the variation and gap thickness (t) was equal to $1 \times 10^{-3}$ inches per turn. An assumed adjustment resolution of plus or minus ten degrees thus permits an adjustment of the gap thickness (t) of $2.8 \times 10^{-5}$ inches. Employing equation (11), the gap thickness (t) is seen to relate to mass flow by the formula:

$$t^3 = 2.1 \times 10^{-6} \omega. \quad (15)$$

The adjustable laminar flow bypass assembly of FIG. 3 was inserted in a flowmeter, as described, and the mass flow ($\omega$) measured in relation to the regression of the flow restrictor as expressed in turns of the number of turns from full insertion. The results of this test are shown in Table 1.

TABLE 1

| Indicated $\omega$ | 10 SCCM | 100 SCCM | 500 SCCM | 1 SLM | 10 SLM | 20 SLM |
| --- | --- | --- | --- | --- | --- | --- |
| #turns from full insertion | 1.40 | 3.00 | 5.0 | 6.44 | 13.72 | 17.36 |
| stroke | 0.025 | 0.053 | 0.09 | 0.115 | 0.245 | 0.310 |
| calculated t | 0.0013 | 0.0028 | 0.0047 | 0.006 | 0.0128 | 0.0162 |

TABLE 1-continued

| Indicated $\omega$ | 10 SCCM | 100 SCCM | 500 SCCM | 1 SLM | 10 SLM | 20 SLM |
| --- | --- | --- | --- | --- | --- | --- |
| calculated resolution | 7% | 3% | 2% | 1.5% | 0.7% | 0.5% |
| $R_a$ | 0.65 | 6.5 | 32.6 | 65.2 | 652 | 1304 | as shown by the calculated Reynold's number, all such flow is seen to be laminar. In accordance with the present invention, the flowmeter containing the adjustable laminar flow bypass, as described in the present example, accurately calibrated mass flow rates of from 10 SCCM to 20 SLM with the same sensor tube, i.e., a measuring tube having a diameter of $1 \times 10^{-2}$ inches and a length of 2.5 inches, and the mass flow rate was adjusted by simple rotation of the frusto-conical flow restrictor. Visual adjustment of the flow restrictor yielded highly accurate adjustment.

Although the foregoing invention has been described in some detail by way of illustration and example, changes in form and substitution of equivalents are contemplated as circumstances may suggest or render expedient. Although specific terms have been employed herein they are intended in a descriptive sense and not for purposes of limitation, the scope of the invention being delineated in the following claims.

We claim:

1. A flowmeter comprising an elongate housing having a fluid inlet, a fluid outlet and a longitudinal bore therebetween, a portion of said bore comprising a frusto-conical, longitudinally tapering wall including a flow restrictor within said bore portion, said flow restrictor comprising a conical frustum supported by a threaded axial spindle disposed in the housing, having a perimeter essentially parallel to at least a portion of the tapering wall and capable of forming an annular conduit therebetween capable of maintaining laminar flow of said fluid, and being longitudinally adjustable to modify the thickness of said conduit; and means for measuring the rate of fluid flow, said means including an elongate conduit in operative association with the annular conduit and means for connecting the elongate conduit with the bore within the length of the annular conduit.

2. The flowmeter according to claim 1 wherein the fluid flow is gas flow.

3. A flowmeter having means for measuring the rate of fluid flow comprising:
   means defining a first fluid path including a frusto-conical bore portion;
   a flow restrictor in said first fluid path comprising a frustum having walls essentially parallel to the frusto-conical bore and supported by a threaded axial spindle, said frustum and said bore being capable of defining an annular gap therebetween which forms a conduit capable of maintaining axial laminar flow of said fluid, the frustum being rotatable with respect to the spindle and the bore to enable incremental adjustment of the annular gap;
   an elongate conduit in operative association with said fluid flow rate, said elongate conduit including the measuring means and defining a laminar flow second fluid path; and
   means within the conduit for connecting said second fluid path in parallel with said first fluid path.

4. The flowmeter according to claim 3 wherein the fluid flow is gas flow.

5. A flowmeter comprising:

an elongate housing having a fluid inlet, a fluid outlet and a longitudinal bore therebetween, a portion of said bore comprising a frusto-conical longitudinally tapering wall including a flow restrictor within said bore portion, said flow restrictor comprising a conical frustum supported by a threaded axial spindle disposed in the housing, having a perimeter essentially parallel to at least a portion of the tapering wall and capable of forming an annular conduit therebetween capable of maintaining laminar flow of said fluid, and being axially and selectively movable with respect to the bore to enable modification of the thickness of said conduit; and means for measuring the rate of fluid flow, including an elongate conduit in operative association with said annular conduit and means for connecting the elongate conduit within the length of the annular conduit.

6. The flowmeter according to claim 5 wherein the fluid flow is gas flow.

7. A flowmeter comprising:

a housing having a fluid inlet and a fluid outlet and defining a first fluid path therebetween, the first fluid path including a frusto-conical bore defining a portion thereof;

a flow restrictor in the first fluid path, comprising a frustum of a cone having a perimeter surface essentially parallel to the perimeter surface of the frusto-conical bore, said frustum being capable of defining an annulus with the frusto-conical portion which provides laminar flow therethrough, and being axially and selectively movable within said frusto-conical bore to provide annuli having variable thicknesses;

measuring means including an elongate conduit in operative association with the annulus; and means for connecting the elongate conduit within the length of the annulus, including a tap at either end of the elongate conduit, the taps being disposed axially in the bore and at least one of the taps opening into the annulus.

8. The flowmeter according to claim 7 wherein the fluid flow is gas flow.

9. A flowmeter having means for measuring the rate of fluid flow comprising:

means defining a first fluid path including a frusto-conical bore portion;

a flow restrictor in said first fluid path comprising a frustum having walls essentially parallel to the frusto-conical bore, said frustum and said bore being capable of defining an annular gap therebetween which forms a conduit capable of maintaining axial laminar flow of said fluid, said frustum being supported by a threaded axial spindle and axially movable to provide annuli of varying thickness by rotational movement with respect to the spindle;

an elongage conduit in operative association with said fluid path, said elongate conduit including the measuring means and defining a laminar flow second fluid path having a fluid inlet and a fluid exit; and means for connecting said second fluid path in parallel with said first fluid path, the fluid inlet being within the annular gap between the frustum and the frusto-conical bore.

10. The flowmeter of claim 9 wherein the connecting means comprise a tap at either end of the elongate conduit, said taps being spaced axially in the bore and opening into the annular gap.

11. The flowmeter according to claim 9 wherein the fluid flow is gas flow.

* * * * *

UNITED STATES PATENT AND TRADEMARK OFFICE
CERTIFICATE OF CORRECTION

PATENT NO. : 4,524,616

DATED : June 25, 1985

INVENTOR(S) : Charles F. Drexel and Richard F. Blair

It is certified that error appears in the above-identified patent and that said Letters Patent are hereby corrected as shown below:

Column 1, line 43, delete "qas" and substitute --gas--;

Column 7, line 17, delete "u" and substitute --$\mu$--;

Column 8, line 1, delete "$\omega$" and substitute --$\dot{\omega}$--;

Column 8, line 28, in Equation (10) delete "$\omega$" and substitute --$\dot{\omega}$--;

Column 8, line 38, delete "$\omega$" and substitute --$\dot{\omega}$--;

Column 8, line 42, in Equation (12), delete "$\omega$" and substitute --$\dot{\omega}$--;

Column 8, line 46, in Equation (13), delete "$\omega$" and substitute --$\dot{\omega}$--;

Column 8, line 51, in Equation (14), delete "$\omega$" and substitute --$\dot{\omega}$--;

Column 8, line 53, delete "$\omega$" and substitute --$\dot{\omega}$--;

Column 8, line 54, after "(R)," add --if--;

Column 9, line 36, delete "$\omega$" and substitute --$\dot{\omega}$--;

UNITED STATES PATENT AND TRADEMARK OFFICE
CERTIFICATE OF CORRECTION

PATENT NO. : 4,524,616
DATED : June 25, 1985
INVENTOR(S) : Charles F. Drexel and Richard F. Blair It is certified that error appears in the above-identified patent and that said Letters Patent are hereby corrected as shown below:

Column 9, line 54, in Equation (15), delete "$\omega$" and substitute --$\dot{\omega}$--;

Column 9, line 58, delete "$\omega$" and substitute --$\dot{\omega}$--; and

Column 12, line 24, delete "elongage" and substitute --elongate--.

Signed and Sealed this

Fifteenth Day of October 1985

[SEAL]

Attest:

Attesting Officer

DONALD J. QUIGG

Commissioner of Patents and
Trademarks—Designate